US011512725B1

(12) United States Patent
Liu et al.

(10) Patent No.: US 11,512,725 B1
(45) Date of Patent: Nov. 29, 2022

(54) BOARD-TO-BOARD FIXTURE HAVING RIVET ROD AND RIVET SLEEVE

(71) Applicants: Chih-Yung Liu, New Taipei (TW); BEST GAJAH Co., LTD., Taoyuan (TW)

(72) Inventors: Chih-Yung Liu, New Taipei (TW); Ching-Yao Hsieh, Taoyuan (TW)

(73) Assignees: Chih-Yung Liu, New Taipei (TW); BEST GAJAH CO., LTD., Taoyuan (TW)

( * ) Notice: Subject to any disclaimer, the term of this patent is extended or adjusted under 35 U.S.C. 154(b) by 0 days.

(21) Appl. No.: 17/523,703

(22) Filed: Nov. 10, 2021

(51) Int. Cl.
*F16B 5/04* (2006.01)
*F16B 19/10* (2006.01)

(52) U.S. Cl.
CPC ............ *F16B 5/04* (2013.01); *F16B 19/1054* (2013.01)

(58) Field of Classification Search
CPC ........ F16B 5/04; F16B 19/1054; F16B 19/08; F16B 19/10; F16B 19/1027; F16B 19/1036; F16B 19/1045; F16B 19/1063
See application file for complete search history.

(56) References Cited

U.S. PATENT DOCUMENTS

| 3,204,517 | A | * | 9/1965 | Looker | F16B 19/1054 411/80.1 |
| 3,377,907 | A | * | 4/1968 | Hurd | F16B 19/1054 411/70 |
| 3,657,957 | A | * | 4/1972 | Siebol | F16B 19/1054 411/70 |
| 5,346,348 | A | * | 9/1994 | Denham | F16B 19/1054 411/70 |
| 5,599,147 | A | * | 2/1997 | Luhm | F16B 19/1054 411/69 |
| 7,150,594 | B2 | * | 12/2006 | Keener | F16B 19/1054 411/908 |
| 11,098,742 | B2 | * | 8/2021 | Athas | F16B 19/109 |

* cited by examiner

*Primary Examiner* — Ryan J. Walters
(74) *Attorney, Agent, or Firm* — Muncy, Geissler, Olds & Lowe, P.C.

(57) ABSTRACT

A board-to-board fixture includes rivet sleeve having hollow tube with perforation inside, stop flange formed on the bottom side of hollow tube, operating space formed in the stop flange to communicate with perforation and expansion portion formed on the top side of hollow tube, and rivet rod having head, tapered impact portion formed on the bottom side of head, deformation portion downwardly protruded from the bottom side of impact portion for pressing against the top side of preset rivet gun socket at the operating space to generate deformation, increasing bump extending downward from the outer edge of the bottom side of deformation portion, breaking portion with a smaller round diameter formed on the center of the bottom side of deformation portion and shank downwardly extending from the bottom side of breaking portion to penetrate the perforation and the operating space through the expansion portion of rivet sleeve.

8 Claims, 12 Drawing Sheets

BOARD-TO-BOARD FIXTURE HAVING RIVET ROD AND RIVET SLEEVE

BACKGROUND OF THE INVENTION

1. Field of the Invention

The present invention relates to a board-to-board fixture, in particular to a rivet rod of a rivet with a tapered impact portion and a deformation portion. When the rivet rod is pulled back and hits the upper edge of the hollow tube of the rivet with the preset rivet gun, the rivet rod is not easy to rotate at the expansion portion of the hollow tube and does not offset the pull-down force to facilitate the smooth riveting operation. At the same time, the deformation portion has the effect of strengthening the head structure of the rivet rod, so that when the tapered impact portion of the rivet rod is pulled back and hits the upper edge of the hollow tube, the head will not break.

2. Description of the Related Art

At present, there are many ways of joining and fixing board to board, the common ones are: welding, cementing, screw locking or rivet fixing, etc. The way to implement the rivet fixing is to first fill the rivet into the rivet gun. When two boards are riveted and joined by a preset rivet gun, the rivet gun can be used to shoot through the two boards, and then the rivet rod of the rivet is pulled out, and the rivet sleeve of the rivet can be deformed and riveted to the two boards, so that the two boards are firmly combined into one.

The generally used rivet structure includes rivet rod and rivet sleeve. The rivet rod has a T-shaped head with a shank extending from one end of the head. The rivet sleeve has a hollow tube body, and a ring-shaped resisting body extends outward at one end of the tube body. The shank of the rivet rod can pass through the inside of the tube body, and the head of the rivet rod is held against the upper edge to complete the assembly, and the assembled rivet can be loaded into the rivet gun. When the rivet gun is used on the two boards, the T-shaped head of the rivet rod will first pass through the two boards, and then use the rivet gun to pull the rivet rod back, so that the head of the rivet rod squeezes into the tube body of the rivet sleeve, the upper edge of the tube body is expanded outward and riveted to the boards. Then the rivet rod can be pulled out of the rivet sleeve, and the two boards can be riveted into one body by the rivet sleeve.

However, during the aforementioned riveting process, since the head of the rivet rod is T-shaped from the side view, the head and the upper edge of the tube of the rivet sleeve are parallel to each other. As a result, when the head is pulled back and hits the upper edge of the tube body, the rivet rod is easy to rotate on the upper edge of the tube body to offset part of the pull-down force, and the user must spend more time operating the rivet gun for the riveting operation. Moreover, the T-shaped structure of the head of the rivet rod is too thin, so that when the head is pulled back and hits the upper edge of the tube body, the head breaks directly, and the upper edge of the tube body cannot be effectively deformed, and the rivet sleeve cannot reliably rivet the two boards into one body. In addition, the T-shaped head is also easy to break and stay inside the tube, and the left head will slip inside the tube, causing the two boards to be easily loosened, which may affect the performance or quality of the rivet sleeve. Therefore, how to try to solve the above-mentioned deficiencies and inconveniences of conventional rivets is the direction that relevant persons engaged in this industry urgently want to study and improve.

SUMMARY OF THE INVENTION

The present invention has been accomplished under the circumstances in view. It is therefore a main object of the present invention to provide a board-to-board fixture, which comprises a rivet sleeve and a rivet rod. The rivet sleeve comprises a hollow tube with a perforation inside, a stop flange formed on a bottom side of the hollow tube and extending outwards, an operating space formed in the stop flange to communicate with the perforation, and an expansion portion formed on an opposing top side of the hollow tube. The rivet rod comprises a head, a tapered impact portion formed on a bottom side of the head, a deformation portion downwardly protruded from a bottom side of the impact portion that can be pressed against a top side of a preset rivet gun socket at the operating space to generate deformation, an increasing bump extending downward from the outer edge of the bottom side of the deformation portion, a breaking portion with a smaller round diameter formed on the center of the bottom side of the deformation portion, and a shank downwardly extending from a bottom side of the breaking portion to penetrate the perforation and the operating space through the expansion portion of the rivet sleeve.

With the setting of the tapered impact portion and deformation portion of the rivet rod mentioned above, when the rivet rod is pulled back and hits the upper edge of the hollow tube with the preset rivet gun, the rivet rod is not easy to rotate at the expansion portion of the hollow tube and does not offset the pull-down force to facilitate the smooth riveting operation. At the same time, the deformation portion has the effect of strengthening the head structure of the rivet rod, so that when the tapered impact portion of the rivet rod is pulled back and hits the upper edge of the hollow tube, the head will not break.

It is another object of the present invention to provide a board-to-board fixture, wherein the hollow tube of the rivet sleeve has an outer wall diameter range of 2.9~3.2 mm and an inner wall diameter range of 2.2~2.4 mm; the height range from the top side of the hollow tube to the bottom side of the stop flange being 2-3 mm; the height range from the junction of the hollow tube and the stop flange to the bottom side of the stop flange being 0.7~0.9 mm; the vertical height range of the outer wall of the bottom side of the stop flange is 0.2~0.4 mm and the vertical height range of the inner wall of the bottom side of the stop flange is 0.2~0.5 mm; the diameter length of the bottom side of the outer wall of the stop flange is 4.9~5.1 mm and the diameter length of the inner wall of the stop flange is 3.05~3.25 mm.

It is still another object of the present invention to provide a board-to-board fixture, wherein the diameter length of the top surface of the head of the rivet rod is 2.9~3.2 mm, the height range from the top surface of the head to the bottom side of the deformation portion is 1-2 mm, and the diameter length of the surface of the bottom side of the deformation portion is in the range of 2.2~2.4 mm.

It is still another object of the present invention to provide a board-to-board fixture, wherein the operating space of the rivet sleeve is a cylindrical space with a top side chamfer, and the angle of the top side chamfer of the operating space ranges from 60 degrees to 120 degrees.

It is still another object of the present invention to provide a board-to-board fixture, wherein a ring-shaped resisting surface on the top side of the preset rivet gun socket is inserted into the stop flange of the rivet sleeve, so that the operating space inside the stop flange presents a "⌒" shaped cylindrical space, and the "⌒" shaped cylindrical space is the space to be filled by the deformation portion of the rivet rod after the deformation portion is deformed.

It is still another object of the present invention to provide a board-to-board fixture, wherein the tapered impact portion slopes upward toward the head at an angle ranging from 60 degrees to 120 degrees.

It is still another object of the present invention to provide a board-to-board fixture, wherein the deformation portion of the rivet rod has an annular outer surface thereof formed with a plurality of longitudinal teeth, a plurality of transverse teeth, a plurality of oblique crossed teeth, or multiple microstructures of various geometric shapes that are engaged with the inner wall of the hollow tube.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
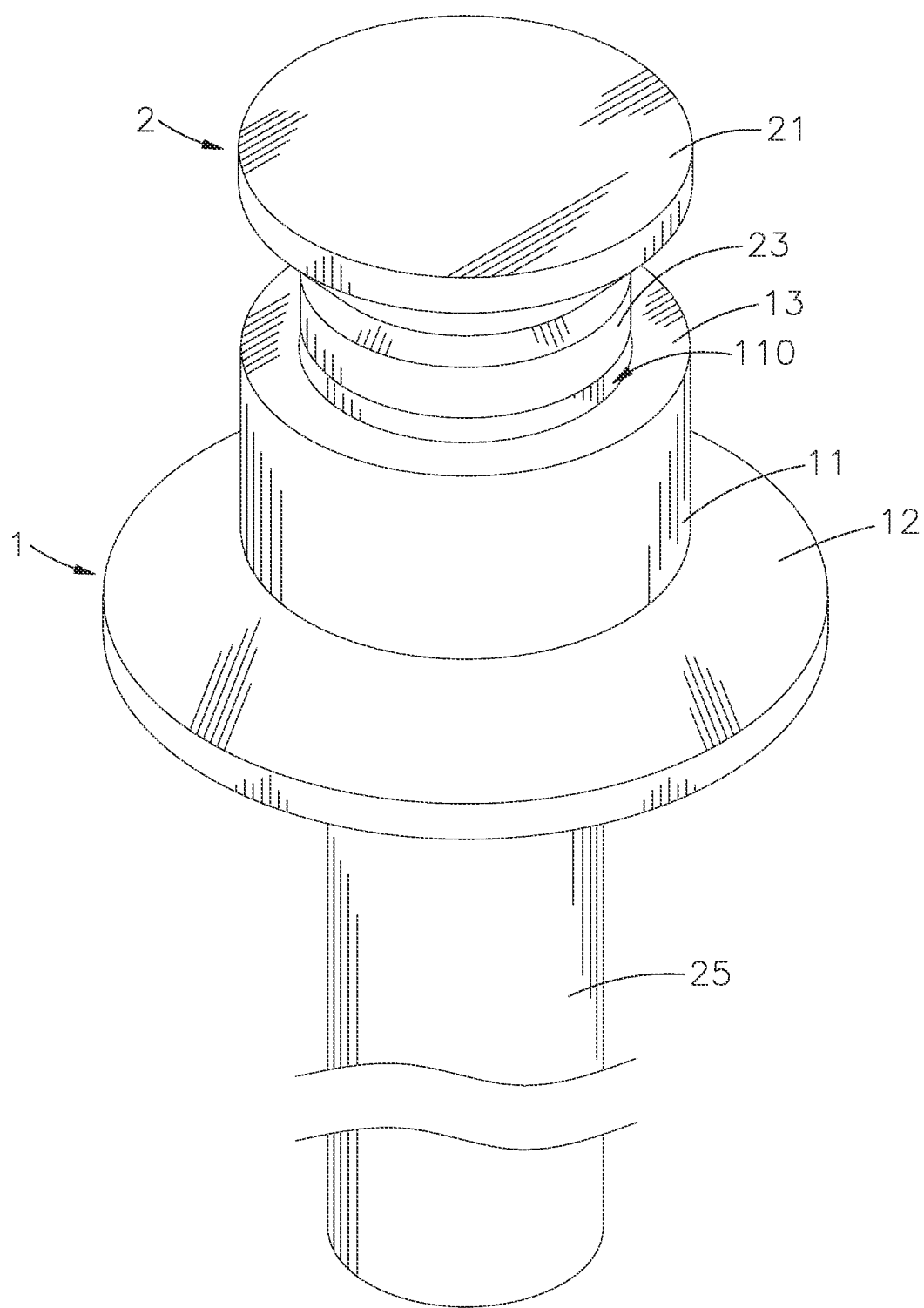
FIG. 1 is an oblique top elevational view of a rivet in accordance with the present invention.
Figure 2:
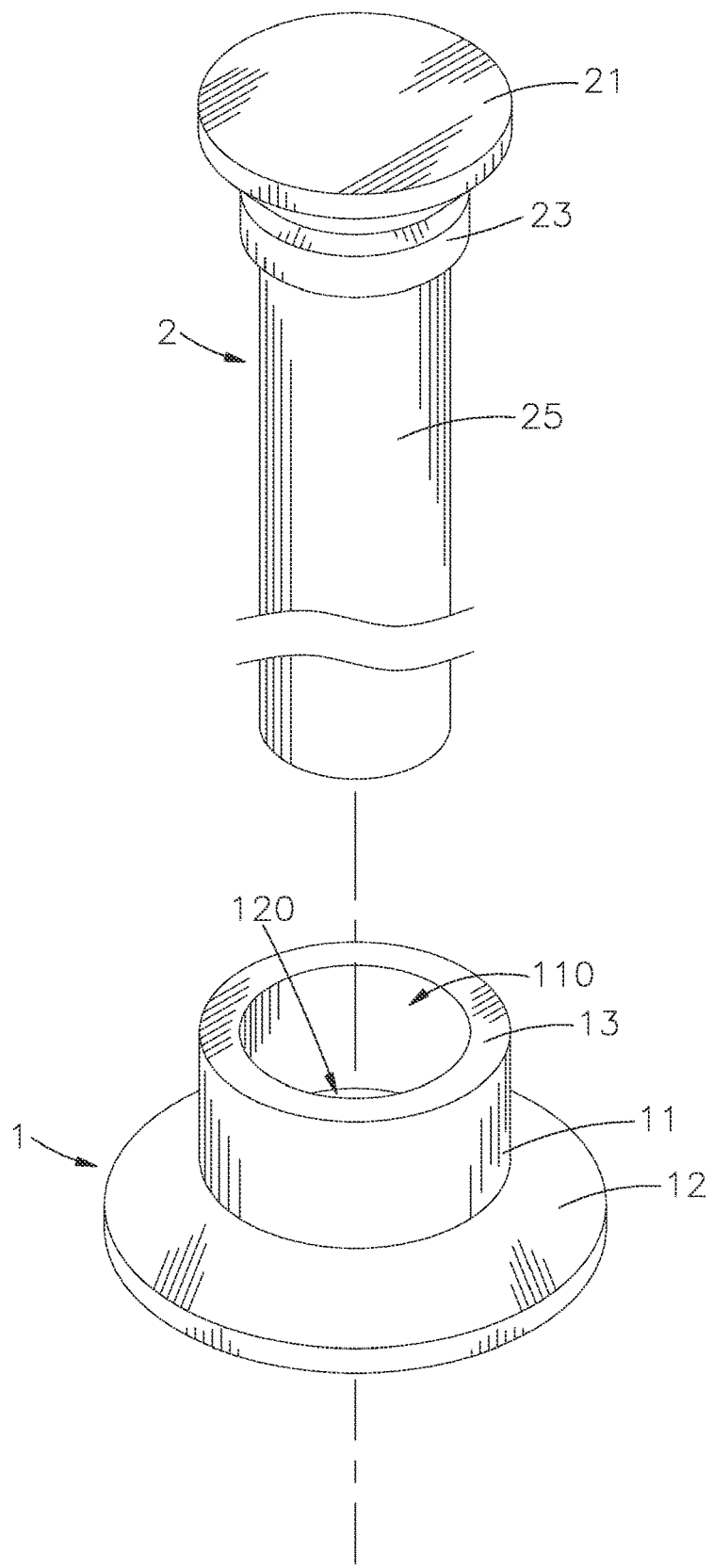
FIG. 2 is an exploded view of the rivet.
Figure 3:
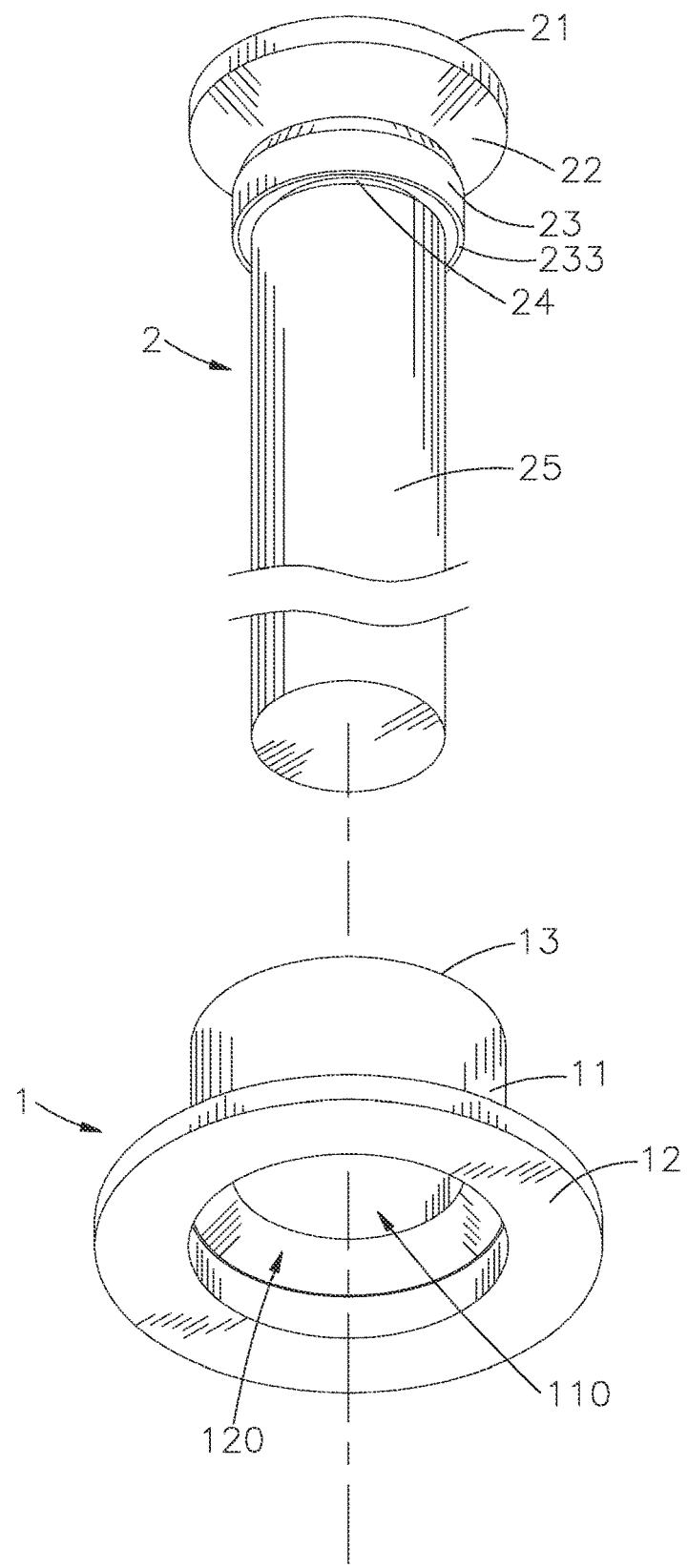
FIG. 3 corresponds to FIG. 2 when viewed from another angle.
Figure 4:
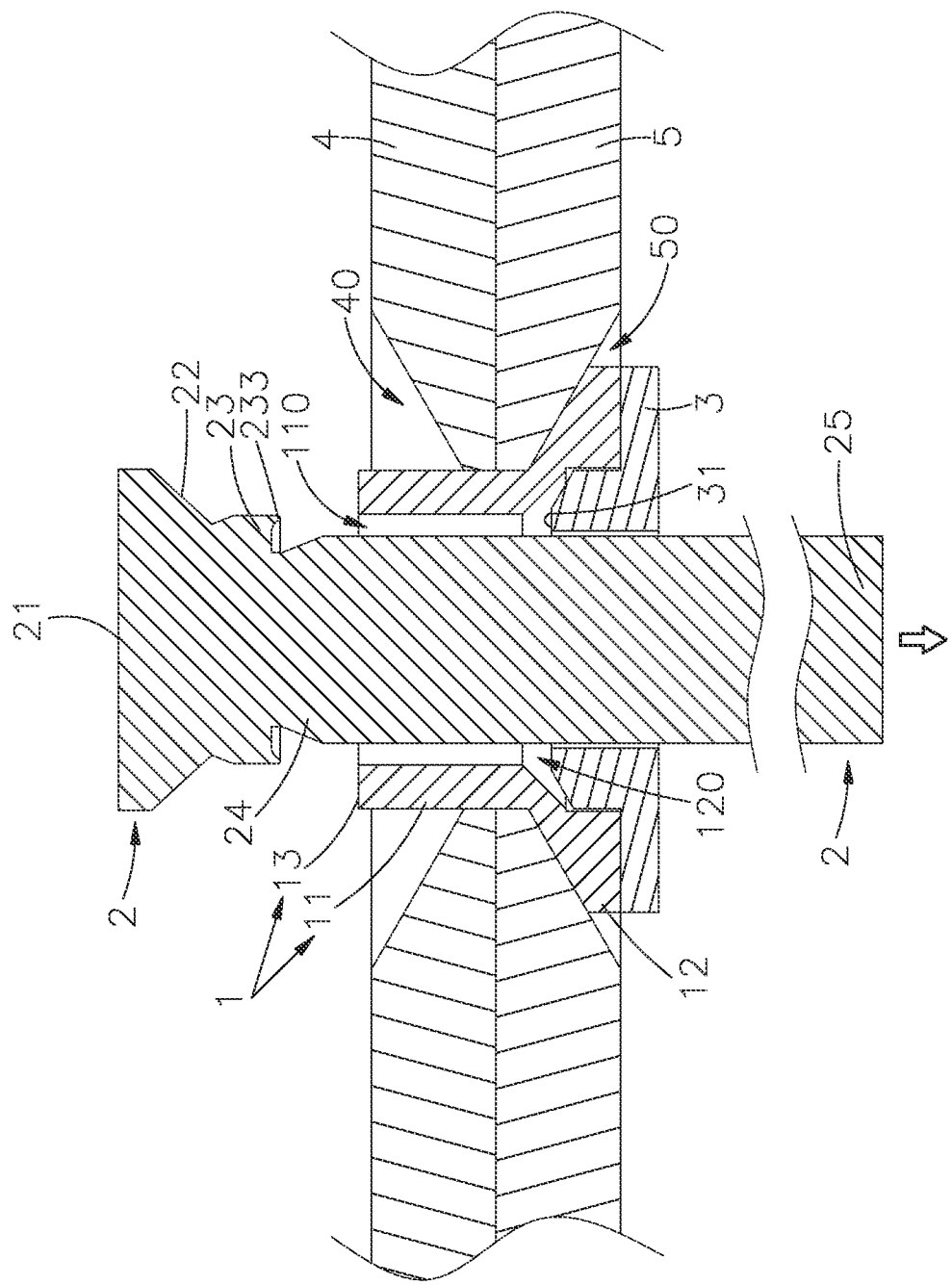
FIG. 4 is a cross-sectional view of an operation side view of the rivet used to fix two boards (I).
Figure 9:
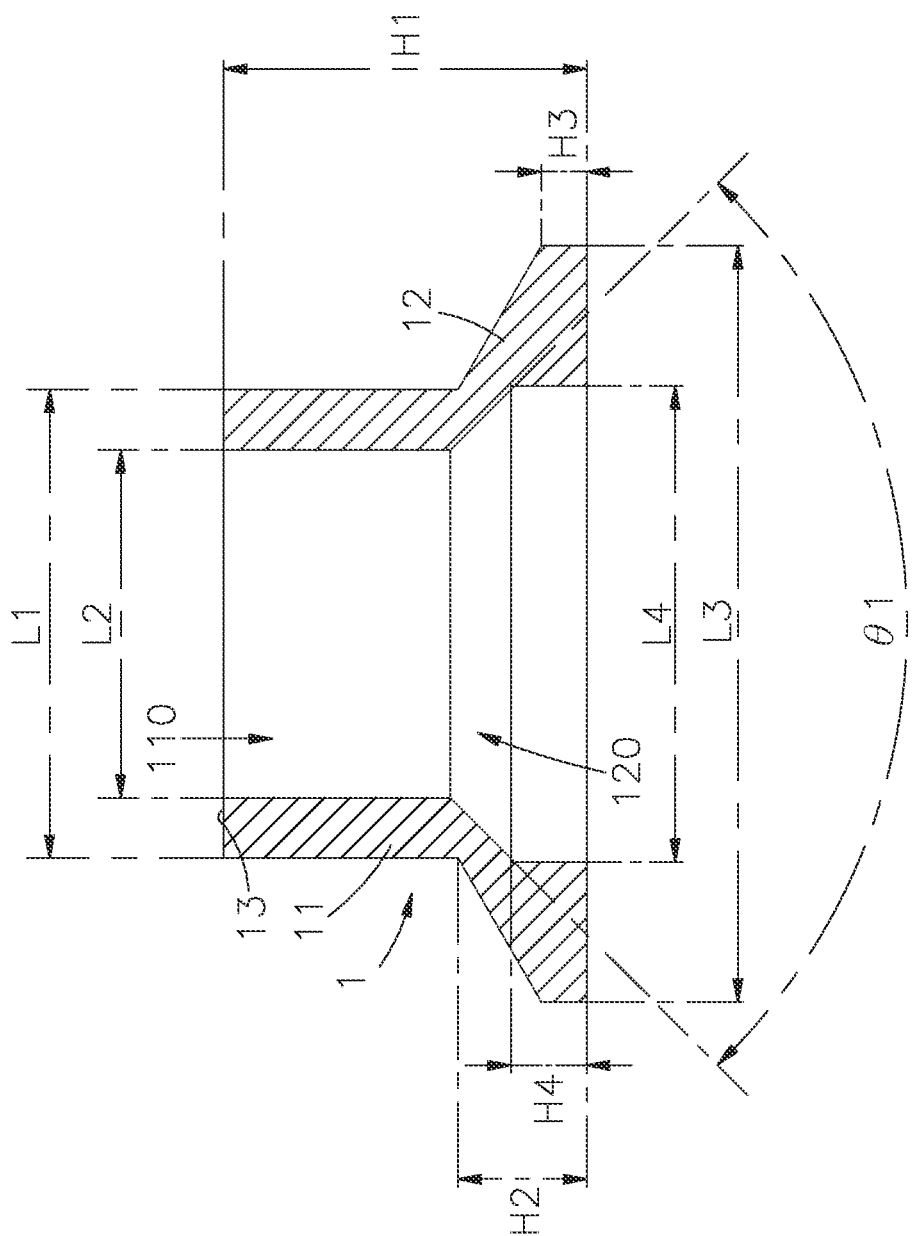
FIG. 9 is a sectional side view of the rivet sleeve of the rivet.
Figure 10:
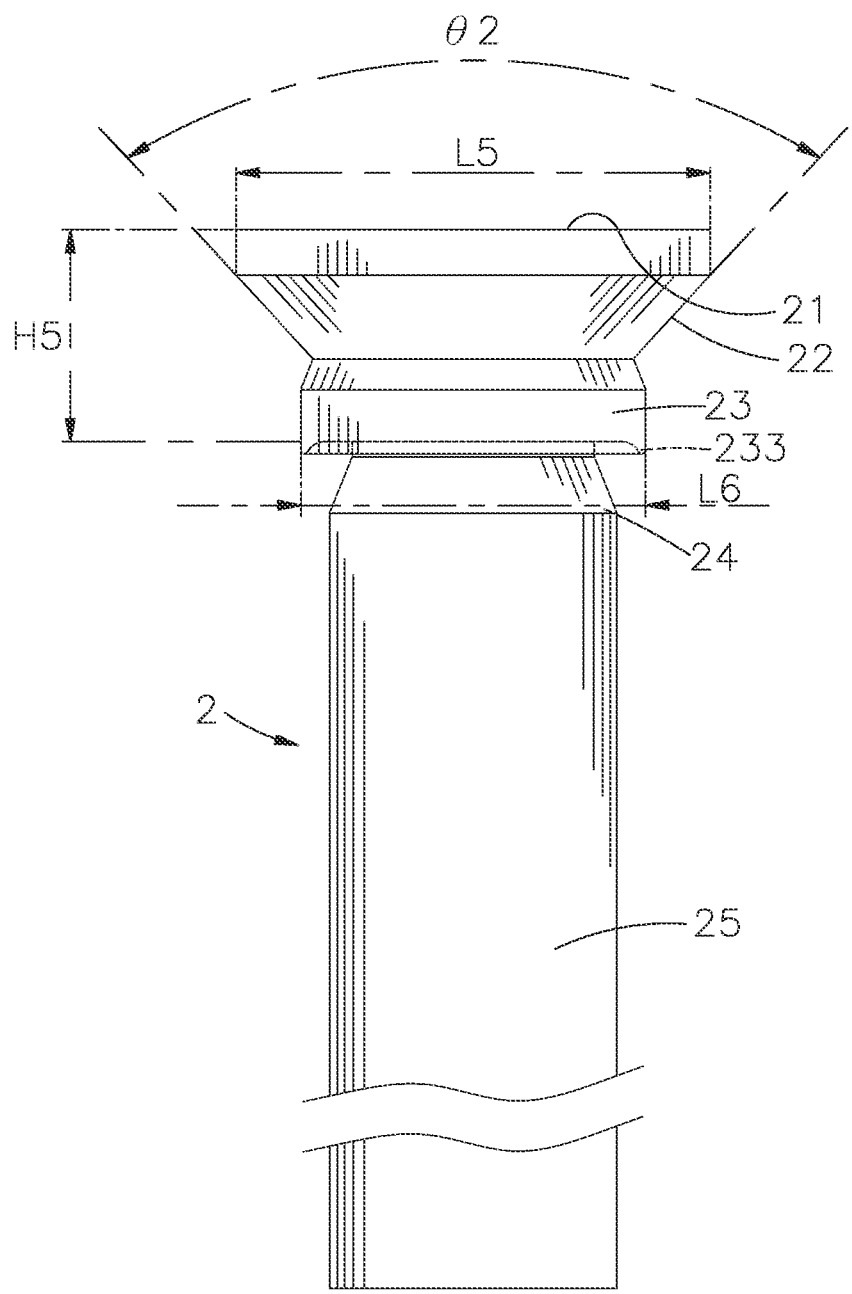
FIG. 10. is a sectional side view of the rivet rod of the rivet.

Referring to FIGS. 1-4 and FIGS. 9 and 10, where FIG. 1 is an oblique top elevational view of a rivet in accordance with the present invention; FIG. 2 is an exploded view of the rivet; FIG. 3 corresponds to FIG. 2 when viewed from another angle; FIG. 4 is a cross-sectional view of an operation side view of the rivet used to fix two boards (I); FIG. 9 is a sectional side view of the rivet sleeve of the rivet; FIG. 10. is a sectional side view of the rivet rod of the rivet. It can be clearly seen from the drawings that the rivet of the present invention is composed of a metal material, and the metal material is one of aluminum, copper, iron or stainless steel. The rivet comprises a rivet sleeve 1 and a rivet rod 2. The detailed structure and connection relationship of the aforementioned components are as follows:

The rivet sleeve 1 comprises a hollow tube 11 with a perforation 110 inside, a stop flange 12 formed on a bottom side of the hollow tube 11 and extending outwards, an operating space 120 formed in the stop flange 12 to communicate with the perforation 110, and an expansion portion 13 formed on an opposing top side of the hollow tube 11.

The rivet rod 2 comprises a head 21, a tapered impact portion 22 formed on a bottom side of the head 21, a deformation portion 23 downwardly protruded from a bottom side of the impact portion 22 that can be pressed against a top side of a preset rivet gun socket 3 at the operating space 120 to generate deformation, an increasing bump 233 extending downward from the outer edge of the bottom side of the deformation portion 23, a breaking portion 24 with a smaller round diameter formed on the center of a bottom side of the deformation portion 23, and a shank 25 downwardly extending from a bottom side of the breaking portion 24 to penetrate the perforation 110 and the operating space 120 through the expansion portion 13 of the rivet sleeve 1.

The operating space 120 of the above-mentioned rivet sleeve 1 is a cylindrical space with a top side chamfer, and the angle θ1 of the top side chamfer of the operating space ranges from 60 degrees to 120 degrees.

The ring-shaped resisting surface 31 on the top side of the preset rivet gun socket 3 is inserted into the stop flange 12 of the rivet sleeve 1, so that the operating space 120 inside the stop flange 12 presents a "⌒" shaped cylindrical space. The "⌒" shaped cylindrical space is the space to be filled by the deformation portion 23 of the rivet rod 2 after the deformation portion 23 is deformed. Through the increasing bump 233 on the bottom side of the deformation portion 23, during the impact deformation process, the metal block filled in the stop flange 12 can be increased, so that the volume of the metal block remaining in the hollow tube 11 and the stop flange 12 is closer, thereby strengthening the fastening force after riveting.

The overall appearance of the head 21 and the tapered impact portion 22 of the rivet rod 2 is a disc-shaped structure with a wide top and a narrow bottom. The overall appearance of the deformation portion 23 is an inverted bowl-shaped structure with a narrow top and a wide bottom. The angle θ2 of the tapered impact portion 22 of the rivet rod 2 inclined upward toward the head 21 ranges from 60 degrees to 120 degrees.

In order to make the thin board with the total thickness of the preset first board 4 and the preset second board 5 between 1.6~2.4 mm in the limited operating space, the rivet (fastener) can exert the maximum tightening force (meaning tensile strength and shear strength), so the following size restrictions have been made. The length L1 of the outer wall diameter of the hollow tube 11 of the rivet sleeve 1 ranges from 2.9~3.2 mm and the length L2 of the inner wall diameter of the hollow tube 11 of the rivet sleeve 1 ranges from 2.2~2.4 mm. The height H1 from the top side of the hollow tube 11 to the bottom side of the stop flange 12 ranges from 2 to 3 mm. The height 112 from the junction of the hollow tube 11 and the stop flange 12 to the bottom side of the stop flange 12 ranges from 0.7 to 0.9 mm. The vertical height 113 of the outer wall of the bottom side of the stop flange 12 ranges from 0.2 to 0.4 mm and the vertical height 114 of the inner wall of the bottom side of the stop flange 12 ranges from 0.2 to 0.5 mm. The length L3 of the diameter of the bottom side of the outer wall of the stop flange 12 ranges 4.9~5.1 mm and the length L4 of the diameter of the bottom side of the inner wall of the stop flange 12 ranges 3.05~3.25 mm.

The length L5 of the diameter of the top surface of the head 21 of the rivet rod 2 is in the range of 2.9~3.2 mm. The height 115 from the top side of the head 21 to the bottom side of the deformation portion 23 is in the range of 1-2 mm. The length L6 of the diameter of the bottom surface of the deformation portion 23 ranges from 2.2 to 2.4 mm.

Figure 11:
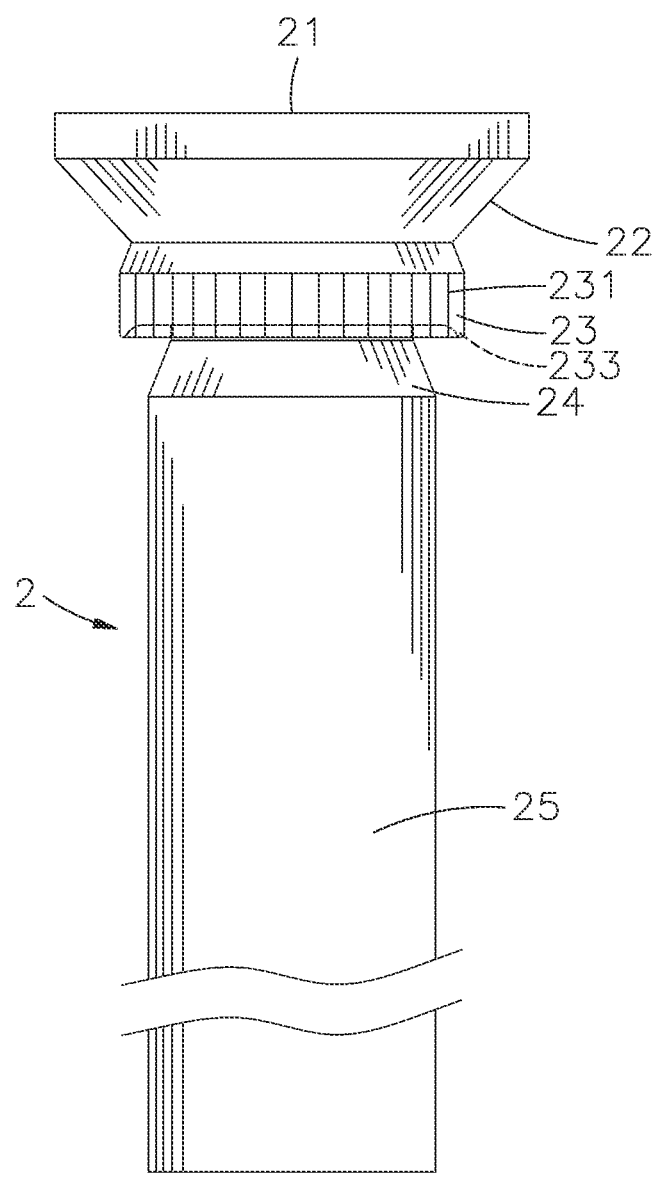
FIG. 11 is a first embodiment diagram of the deformation portion to increase the bite force.
Figure 12:
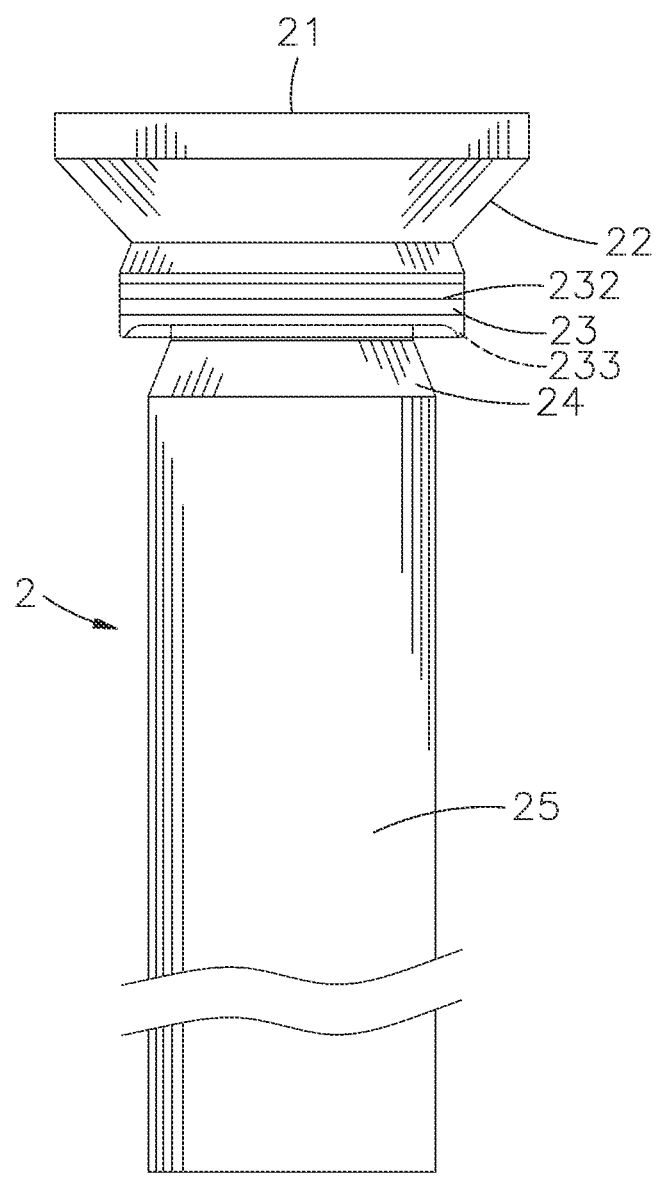
FIG. 12 is a second embodiment diagram of the deformation portion to increase the bite force.

Please refer to FIGS. 11 and 12, which are the first and second embodiment diagrams of the deformation portion of the rivet rod of the present invention to increase the bite force. The annular outer surface of the deformation portion 23 of the rivet rod 2 is formed with a plurality of longitudinal teeth 231, a plurality of transverse teeth 232, a plurality of oblique crossed teeth (not shown), or multiple microstructures of various geometric (circular, elliptical, triangular or rectangular) shapes (not shown) that are engaged with the inner wall of the hollow tube 11. Any reinforced occlusal shape or structure that can be formed on the surface of the deformation portion 23 of the rivet rod 2 is within the protection scope of the present invention. In this way, when the rivet rod 2 is put in the rivet sleeve 1 for riveting the two boards, it will not produce rotation and offset the pulling force toward the preset rivet gun socket 3, so that the riveting process is more labor-saving and has a high-efficiency function.

When the above-mentioned rivet is combined with a preset first board 4 and a preset second board 5, the preset first board 4 and the preset second board 5 are provided with a symmetrical riveting perforation (40, 50), and the two riveting perforations (40, 50) are each inclined inwardly concave structure. The stop flange 12 is pressed against the riveting perforation 50 of the second board 5, and the tapered impact portion 22 of the rivet rod 2 is pulled out at the same time to make the inner wall of the expansion portion 13 expand and deform under stress. At this time, the outer wall of the expansion portion 13 is against the riveting perforation 40 of the first board 4, and the expansion portion 13 and the stop flange 12 are on the two sides of the riveting perforations (40, 50) of the preset first and second boards (4, 5) to form a riveted state and form a fixed structure.

Figure 5:
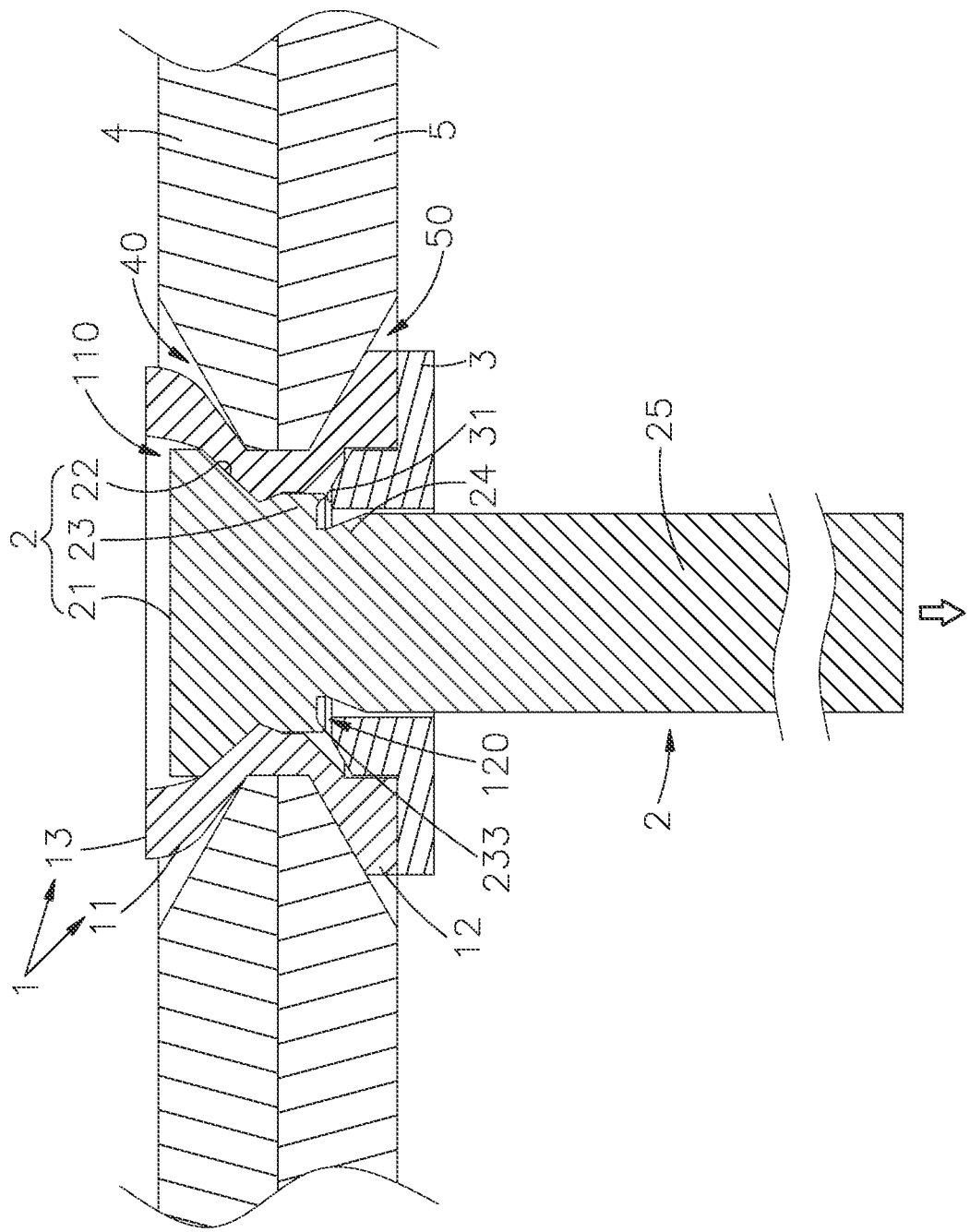
FIG. 5 is a cross-sectional view of an operation side view of the rivet used to fix two boards (II).
Figure 6:
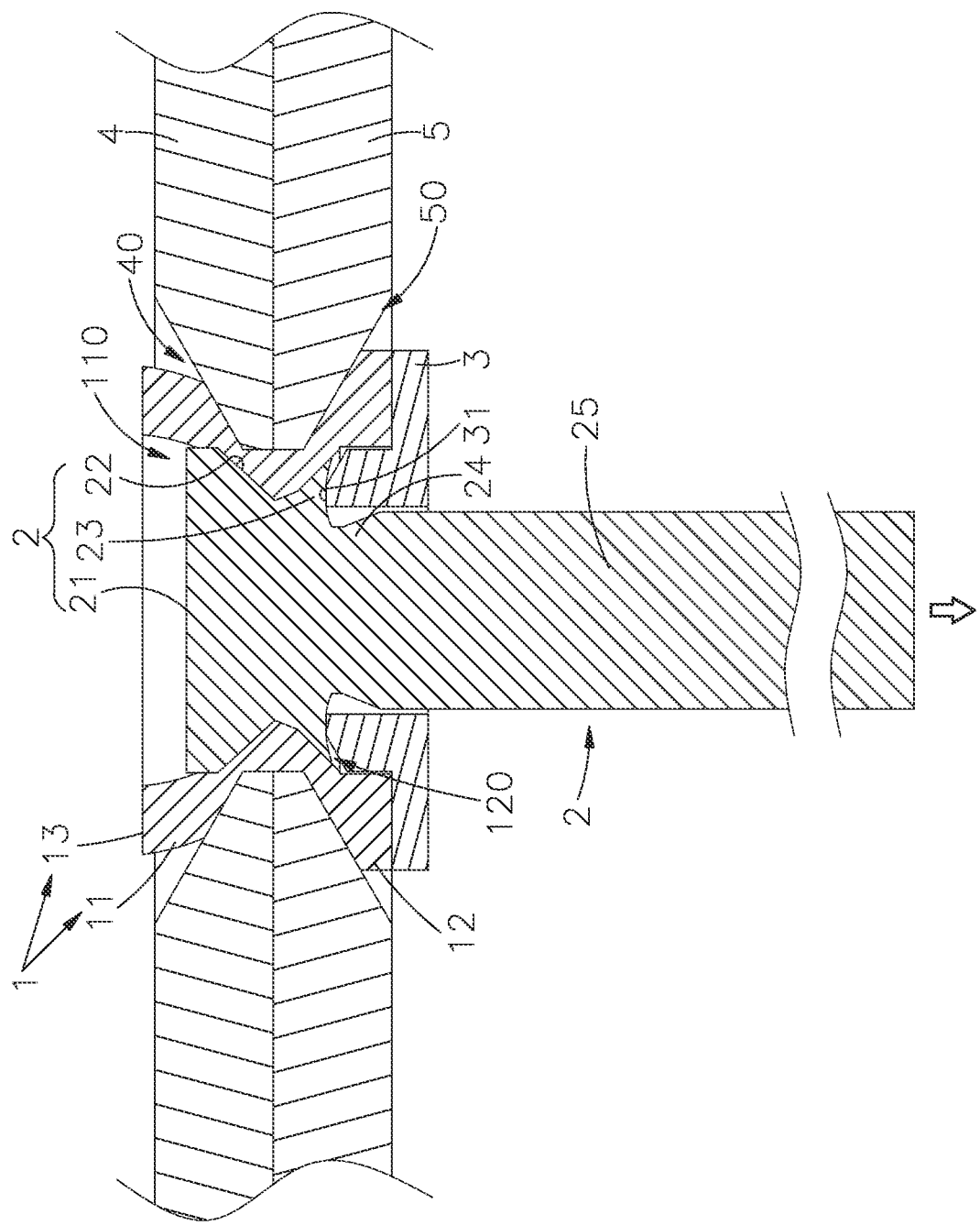
FIG. 6 is a cross-sectional view of an operation side view of the rivet used to fix two boards (III).
Figure 7:
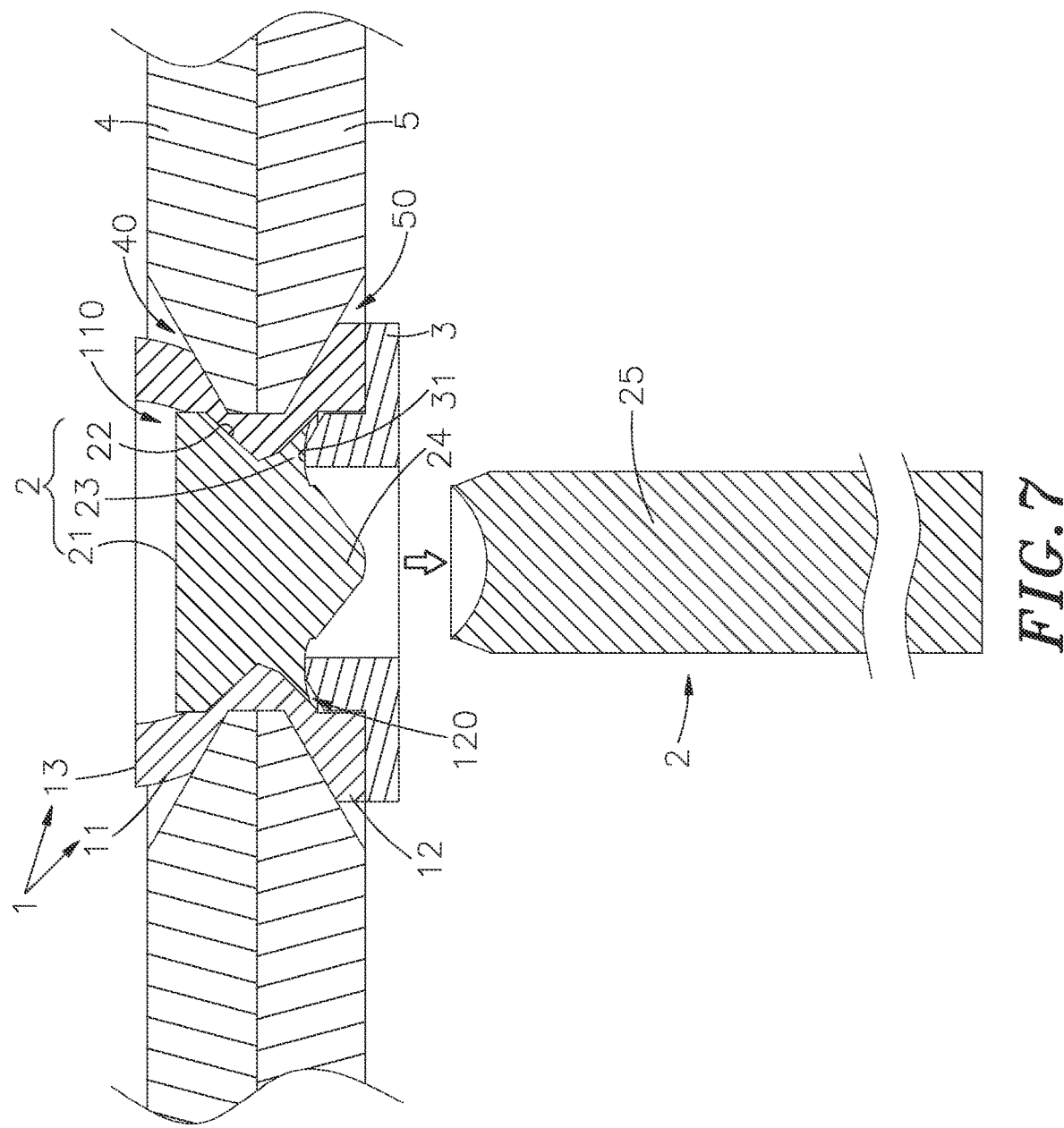
FIG. 7 is a cross-sectional view of an operation side view of the rivet used to fix two boards (IV).
Figure 8:
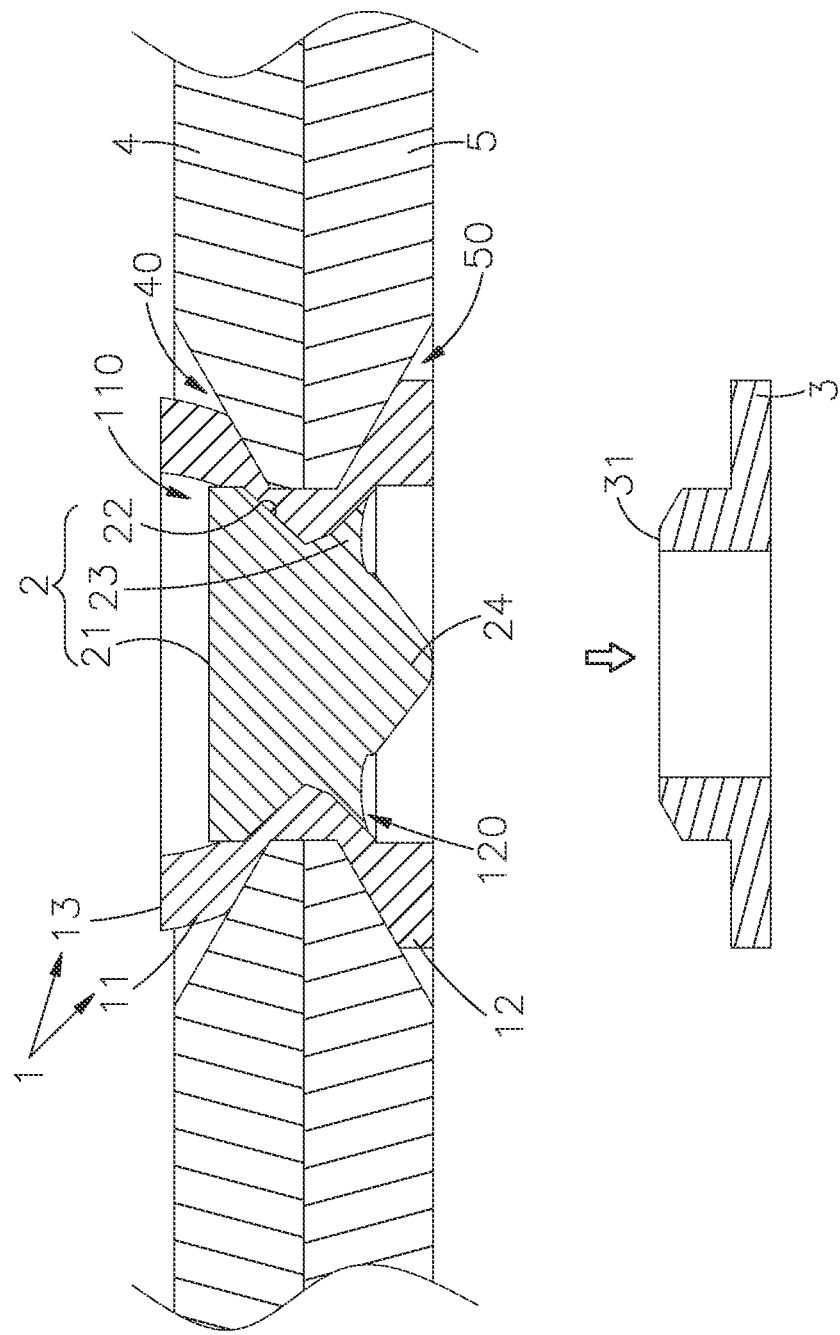
FIG. 8 is a cross-sectional view of an operation side view of the rivet used to fix two boards (V).

Referring to FIGS. 4-8, where FIG. 4 is a cross-sectional view of an operation side view of the rivet used to fix two boards (I); FIG. 5 is a cross-sectional view of an operation side view of the rivet used to fix two boards (II); FIG. 6 is a cross-sectional view of an operation side view of the rivet used to fix two boards (III); FIG. 7 is a cross-sectional view of an operation side view of the rivet used to fix two boards (IV); FIG. 8 is a cross-sectional view of an operation side view of the rivet used to fix two boards (V). When the rivet is combined with a preset first board 4 and a preset second board 5, the preset first board 4 and the preset second board 5 are provided with a symmetrical riveting perforation (40, 50), and the two riveting perforations (40, 50) are each inclined inwardly concave structure. The stop flange 12 is pressed against the riveting perforation 50 of the second board 5. Continue to put the shank 25 of the rivet rod 2 on the top side of the expansion portion 13 of rivet sleeve 1, and then apply force from top to bottom to the head 21 of the rivet rod 2 to make the shank 25 protrude from the bottom side of the stop flange 12 of the rivet sleeve 1. At this time, insert the end of the shank 25 into the clamping port of the preset rivet gun socket 3 for a fixation (as shown in FIG. 4). Then operate the preset rivet gun (not shown) to generate a downward pull force on the rivet rod 2, so that the tapered impact portion 22 of the rivet rod 2 is against the top side of the expansion portion 13 of the rivet sleeve 1. Continue to operate the preset rivet gun to cause the tapered impact portion 22 of the rivet rod 2 to generate a downward compressive stress, and the downward compressive stress generated by the tapered impact portion 22 causes the inner wall of the expansion portion 13 to be subjected to the support stress of the rivet rod 2 to expand and deform (as shown FIG. 5). During the pulling process of the rivet rod 2, when it is pressed by the resisting surface 31 on the top side of the preset rivet gun socket 3, it deforms, so that the deformation portion 23 is deformed and filled in the operating space 120 in the shape of "⌐" (as shown in FIG. 6). Through the increasing bump 233 on the bottom side of the deformation portion 23, during the impact deformation process, the metal block filled in the stop flange 12 can be increased, so that the volume of the metal block remaining in the hollow tube 11 and the stop flange 12 is closer. Continue to operate the preset rivet gun to pull the rivet rod 2 downwards to cause fracture and separation between the fragile deformation portion 23 and the breaking portion 24, so that the shank 25 of the rivet rod 2 can be drawn from the rivet sleeve 1 (as shown in FIG. 7) to complete the riveting structure of the first and second boards (4, 5), and then the preset rivet gun socket 3 is separated from the operating space 120 of the rivet sleeve 1 (as shown in FIG. 8), and thus, the riveting operation of the present invention is completed.

According to the disclosure of the above FIGS. 1 to 12, it can be understood that the present invention is a board-to-board fixture, which comprises a rivet sleeve and a rivet rod. The rivet sleeve comprises a hollow tube with a perforation inside, a stop flange formed on a bottom side of the hollow tube and extending outwards, an operating space formed in the stop flange to communicate with the perforation, and an expansion portion formed on an opposing top side of the hollow tube. The rivet rod comprises a head, a tapered impact portion formed on a bottom side of the head, a deformation portion downwardly protruded from a bottom side of the impact portion that can be pressed against a top side of a preset rivet gun socket at the operating space to generate deformation, an increasing bump extending downward from the outer edge of the bottom side of the deformation portion, a breaking portion with a smaller round diameter formed on the center of a bottom side of the deformation portion, and a shank downwardly extending from a bottom side of the breaking portion to penetrate the perforation and the operating space through the expansion portion of the rivet sleeve. With the setting of the tapered impact portion and deformation portion of the rivet rod mentioned above, when the rivet rod is pulled back and hits the upper edge of the hollow tube with the preset rivet gun, the rivet rod is not easy to rotate at the expansion portion of the hollow tube and does not offset the pull-down force to facilitate the smooth riveting operation. At the same time, the deformation portion has the effect of strengthening the head structure of the rivet rod, so that when the tapered impact portion of the rivet rod is pulled back and hits the upper edge of the hollow tube, the head will not break. The present invention is applied in the field of riveting two boards and has excellent practicability, so a patent application is filed to seek protection of the patent right.

What the invention claimed is:

1. A board-to-board fixture, comprising:
   a rivet sleeve comprising a hollow tube with a perforation inside, a stop flange formed on a bottom side of said hollow tube and extending outwards, an operating space formed in said stop flange to communicate with said perforation and an expansion portion formed on an opposing top side of said hollow tube, said hollow tube of said rivet sleeve having an outer wall diameter range of 2.9~3.2 mm and an inner wall diameter range of 2.2~2.4 mm, the height range from a top side of said hollow tube to a bottom side of said stop flange being 2~3 mm, the height range from the junction of said hollow tube and said stop flange to a bottom side of said stop flange being 0.7~0.9 mm, the vertical height range of the outer wall of the bottom side of said stop flange being 0.2~0.4 mm and the vertical height range of the inner wall of the bottom side of said stop flange being 0.2~0.5 mm, the diameter length of the bottom side of the outer wall of said stop flange being 4.9~5.1 mm and the diameter length of the inner wall of said stop flange being 3.05~3.25 mm; and a rivet rod comprising a head with a top surface, a tapered impact portion formed on a bottom side of said head, a deformation portion downwardly protruded from a bottom side of said impact portion for pressing against a top side of a preset rivet gun socket at said operating space to generate deformation, an increasing bump extending downward from an outer edge of the bottom side of said deformation portion, a breaking portion with a smaller round diameter formed on a center of a bottom side of said deformation portion, and a shank downwardly extending from a bottom side of said breaking portion to penetrate said perforation and said operating space through said expansion portion of said rivet sleeve, the diameter length of the top surface of said head of said rivet rod being 2.9~3.2 mm, the height range from said top surface of said head to a bottom side of said deformation portion being 1~2 mm, the diameter length of the surface of the bottom side of said deformation portion being in the range of 2.2~2.4 mm.

2. The board-to-board fixture as claimed in claim 1, wherein the overall appearance of said head and said tapered impact portion of said rivet rod is a circular dish-shaped structure with a wide top and a narrow bottom.

3. The board-to-board fixture as claimed in claim 1, wherein the overall appearance of said deformation portion is an inverted bowl-shaped structure with a narrow top and a wide bottom.

4. The board-to-board fixture as claimed in claim 1, wherein said operating space of said rivet sleeve is a cylindrical space with a top side chamfer, and the angle of said top side chamfer of said operating space ranges from 60 degrees to 120 degrees.

5. The board-to-board fixture as claimed in claim 1, wherein a ring-shaped resisting surface on a top side of said preset rivet gun socket is inserted into said stop flange of said rivet sleeve, so that said operating space inside said stop flange presents a "⌐" shaped cylindrical space, and said "⌐" shaped cylindrical space is the space to be filled by said deformation portion of said rivet rod after said deformation portion is deformed.

6. The board-to-board fixture as claimed in claim 1, wherein said tapered impact portion slopes upward toward said head at an angle ranging from 60 degrees to 120 degrees.

7. The board-to-board fixture as claimed in claim 1, wherein when the board-to-board fixture is combined with a preset first board and a preset second board, said preset first board and said preset second board are provided with a symmetrical riveting perforation, and the two riveting perforation of said preset first board and said preset second board are each inclined inwardly concave structure, said stop flange is pressed against said riveting perforation of said second board, and said tapered impact portion of said rivet rod is pulled out at the same time to make the inner wall of said expansion portion expand and deform under stress, and at this time, the outer wall of said expansion portion is against said riveting perforation of said first board, and said expansion portion and said stop flange are on the two sides of said riveting perforations of said preset first and second boards to form a riveted state and form a fixed structure.

8. The board-to-board fixture as claimed in claim 1, wherein said deformation portion of said rivet rod has an annular outer surface thereof selectively formed with a plurality of longitudinal teeth, a plurality of transverse teeth, a plurality of oblique crossed teeth, or multiple microstructures of various geometric shapes that are engaged with the inner wall of said hollow tube.

\* \* \* \* \*